United States Patent
Trench Roca et al.

(10) Patent No.: US 9,814,344 B2
(45) Date of Patent: Nov. 14, 2017

(54) COOKING APPLIANCE FOR PROCESSING AND PREPARING FOODS WITH AN EXTERNAL USER INTERFACE

(71) Applicant: COMPAÑIA ESPAÑOLA DE ELECTROMENAJE S.L., Oliana (Lleida) (ES)

(72) Inventors: Lluis Trench Roca, Sallent (ES); Josep Alet Vidal, Oliana (ES); Fidel Montraveta Montraveta, Oliana (ES)

(73) Assignee: COMPANIA ESPANOLA DE ELECTROMENAJE S.A., Oliana (Lleida) (ES)

( * ) Notice: Subject to any disclaimer, the term of this patent is extended or adjusted under 35 U.S.C. 154(b) by 598 days.

(21) Appl. No.: 14/286,989

(22) Filed: May 24, 2014

(65) Prior Publication Data

US 2014/0345475 A1    Nov. 27, 2014

(30) Foreign Application Priority Data

May 24, 2013 (EP) .................................... 13380022

(51) Int. Cl.
A47J 37/12 (2006.01)
A47J 27/62 (2006.01)
(Continued)

(52) U.S. Cl.
CPC .............. *A47J 27/62* (2013.01); *A47J 43/00* (2013.01); *A47J 43/04* (2013.01); *A47J 44/00* (2013.01); *G06F 17/30* (2013.01)

(58) Field of Classification Search
CPC .. A47J 27/02; A47J 43/04; A47J 43/06; A47J 43/0716; A47J 43/0722; A47J 44/00; A47J 44/02; A47J 43/00
(Continued)

(56) References Cited

U.S. PATENT DOCUMENTS 5,363,746 A    11/1994  Gordon
5,960,701 A *  10/1999  Reese .................. B67D 1/0039
                                           222/135
(Continued)

FOREIGN PATENT DOCUMENTS

DE    102010060650 A1    5/2011
EP          1561409 B1    7/2009
(Continued)

OTHER PUBLICATIONS

U.S. Appl. No. 14/285,995, Lluis Trench Rocha.
U.S. Appl. No. 14/286,989, Lluis Trench Rocha.

*Primary Examiner* — Phuong Nguyen
(74) *Attorney, Agent, or Firm* — Robert J. Hess; Hess Patent Law Firm

(57) ABSTRACT

A cooking appliance for processing and preparing foods with an external user interface that includes a base structure (48) on which a support suitable for holding a container (2) containing foods to be processed is assembled, motorized driving device suitable for rotating detachable stirring or cutting means inside the container (2), an electronic circuit for powering and controlling the driving device and heat energy transferring means controlled by an appliance microcontroller, a user interface integrated in a user computing device (D) detached with respect to the appliance for inputting operating parameters of the appliance, and the user computing device (D) is communicated with the appliance microprocessor through a wireless communication interface for inputting operating instructions of the appliance or cooking programs.

14 Claims, 7 Drawing Sheets

(51) Int. Cl.
*A47J 43/04* (2006.01)
*A47J 44/00* (2006.01)
*A47J 43/00* (2006.01)
*G06F 17/30* (2006.01)

(58) Field of Classification Search
USPC ......... 99/325, 348, 403, 353, 275, 300, 316, 99/484, 486
See application file for complete search history.

(56) References Cited

U.S. PATENT DOCUMENTS

| | | |
|---|---|---|
| 6,565,903 B2 | 5/2003 | Ng |
| 6,805,312 B2 | 10/2004 | Capp |
| 2002/0009016 A1 | 1/2002 | Ancona |
| 2004/0093379 A1* | 5/2004 | Roh ........................ F25D 29/00 709/203 |
| 2008/0225636 A1 | 9/2008 | Kolar |
| 2011/0149677 A1* | 6/2011 | Davis ..................... A47J 43/042 366/205 |
| 2012/0226764 A1* | 9/2012 | Philip .................... H04L 67/125 709/208 |
| 2014/0109770 A1* | 4/2014 | Kolar ....................... A23G 9/30 99/275 |
| 2014/0269154 A1* | 9/2014 | Kolar ................ B01F 15/00201 366/142 |

FOREIGN PATENT DOCUMENTS

| | | | |
|---|---|---|---|
| EP | 2 540 199 A1 | 1/2013 | |
| ES | EP 1731068 A1 * | 12/2006 | ............ A47J 27/002 |
| GB | 2 457 722 A | 8/2009 | |
| WO | WO 01/52515 A1 | 7/2001 | |
| WO | WO2008/112066 A1 | 9/2008 | |
| WO | WO 2011/069833 A1 | 6/2011 | |
| WO | WO 2012/123498 A2 | 9/2012 | |

* cited by examiner

COOKING APPLIANCE FOR PROCESSING AND PREPARING FOODS WITH AN EXTERNAL USER INTERFACE

FIELD OF THE ART

The present invention generally relates to a cooking appliance for processing and preparing foods with an external user interface, and more particularly to a cooking appliance comprising a support for a container, driving means for rotating blades inside a container for containing foods to be processed, heat energy transferring means arranged for heating the foods in the container, an electronic circuit for powering and controlling said driving means and heat energy transferring means which is controlled by an appliance microcontroller depending on the instructions containing cooking parameters that are provided by a user through a user interface which is not integrated in the machine.

BACKGROUND OF THE INVENTION

A cooking appliance having features which are similar to this type is disclosed by documents U.S. Pat. No. 5,363,746 A, U.S. Pat. No. 6,565,903 B2, EP 1561409 B1 or DE 102010060650 A1.

All the documents mentioned have the particularity of including a user interface containing a set of controls and/or push buttons and at least one display on which operating parameters of the cooking appliance itself or instructions referring to a cooking recipe, for example, are displayed. The mentioned backgrounds also disclose the inclusion of means for communicating the mentioned cooking appliance with a remote computing device for various interactions with the appliance.

As of today, however, there is no known cooking appliance which is devoid of a user interface integrated in the appliance itself for inputting operating parameters of said cooking appliance and which in turn allows communicating with a remote computing device.

DESCRIPTION OF THE INVENTION

Based on the foregoing, an object of the present invention is to provide a cooking appliance which lacks a user interface in the cooking appliance itself, such that the circuitry primarily for connections necessary in the cooking appliance is reduced, simpler design configurations of the appliance casing are allowed with additional features (only limited by the dimensions of the driving and cooling motors) and maintenance is simplified.

To that end, the invention provides a cooking appliance for processing and preparing foods with an external user interface comprising according to conventional technique: a base structure on which a support suitable for holding a container containing foods to be processed is assembled; motorized driving means for rotating detachable stirring or cutting means inside said container; heat energy transferring means for heating said foods to be processed within the container; an electronic circuit for powering and controlling said driving means and heat energy transferring means which is controlled by an appliance microcontroller depending on the instructions which are provided by a user through a user interface and contain cooking parameters. An appliance of this class is described in EP 1731068 B1 belonging to the same applicant although, like the mentioned background documents, it has a user interface for handling the appliance integrated in the cooking appliance for inputting operating parameters thereof.

In a characteristic manner and unlike the solutions previously known in the state of the art, in the proposed cooking appliance, said user interface is provided by an independent user computing device that is separate with respect to the machine (i.e., not directly connected to the machine, although it can be arranged next to it and even be supported in a housing prepared for that purpose), i.e., the cooking appliance does not include any control, knob/push button or display; and said user computing device is communicated with said appliance microprocessor through a wireless communication interface for inputting operating instructions of the appliance or cooking programs, particularly from a multifunction touch screen of the computing device itself.

The user interface can be customized and is preferably accessed by means of a user account and/or password.

According to a first embodiment, in the cooking appliance, the mentioned instructions containing cooking parameters are stored in said user computing device in a memory thereof.

In a characteristic manner, the user computing device providing said user interface according to the invention is, for example, a tablet PC, a smartphone, a PDA, a portable computer or PC, etc., with the ability to interact with a communication network by means of a technology selected from WiFi, 3G or Bluetooth, among others.

According to another embodiment, the instructions containing cooking parameters are stored in a memory accessible through said communication network by said computing device, said instructions being able to be edited by a user.

Said user computing device includes a voice recognition function for inputting operating instructions of the cooking appliance.

The mentioned user computing device can be a dedicated computing device, i.e., with a limited functionality relating to the cooking appliance control operations, or a general-purpose computing device with applications loaded in a memory (or complementary and downloadable from a communication network) to perform the mentioned tasks of controlling the cooking appliance, in addition to other standard functionalities of the user computing device itself with telecommunication ability.

BRIEF DESCRIPTION OF THE DRAWINGS

The foregoing and other advantages and features will be better understood from the following detailed description of several embodiments in reference to the attached drawings, in which.

DETAILED DESCRIPTION OF SEVERAL EMBODIMENTS

Figure 1A:
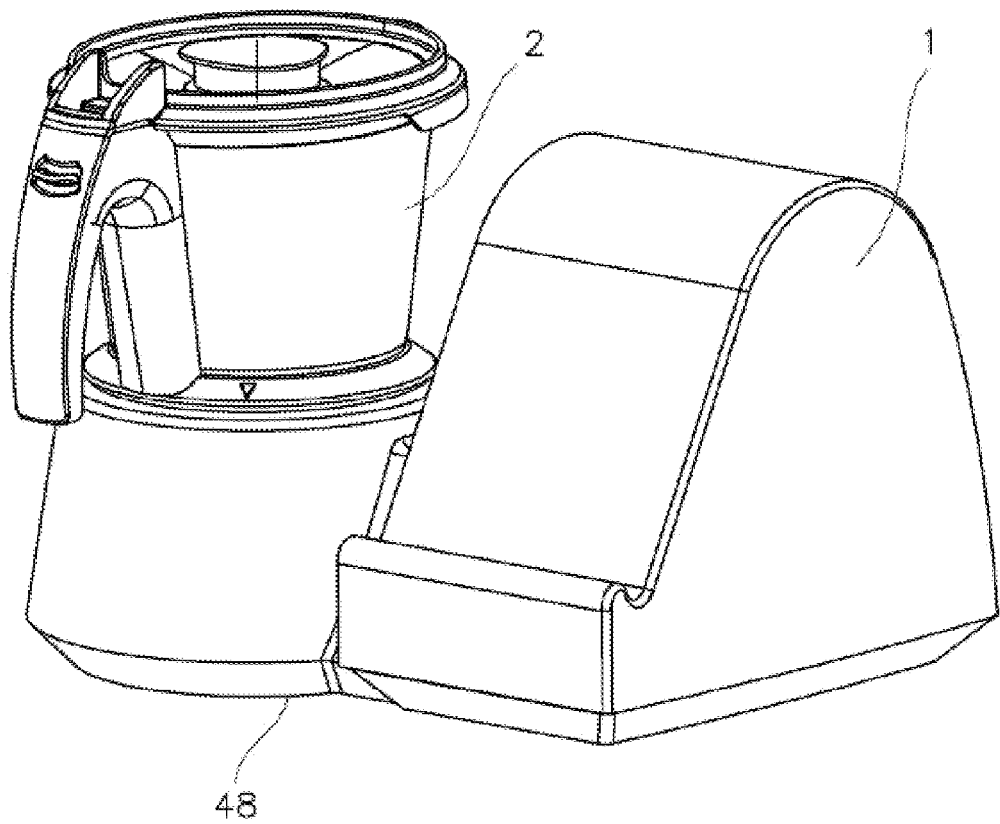
FIG. 1A is an axonometric view of the cooking appliance of the present invention according to one embodiment.

FIG. 1a shows a cooking appliance for processing and preparing foods according to one embodiment of the present invention. The cooking appliance comprises a base structure 48 for holding a container 2 envisaged for containing foods to be processed or prepared. According to the mentioned embodiment, a casing 1 having an opening through which the container 2 can be placed on or removed from a support is assembled on said base structure 48.

As can be observed in FIG. 1A and in a characteristic manner of the invention, the casing 1 comprises a completely smooth surface, i.e., the proposed cooking appliance does not include any user interface which contains controls, knobs/push buttons or display, etc., and this interface is provided by a user computing device D that is separate with respect to the machine.

Figure 1B:
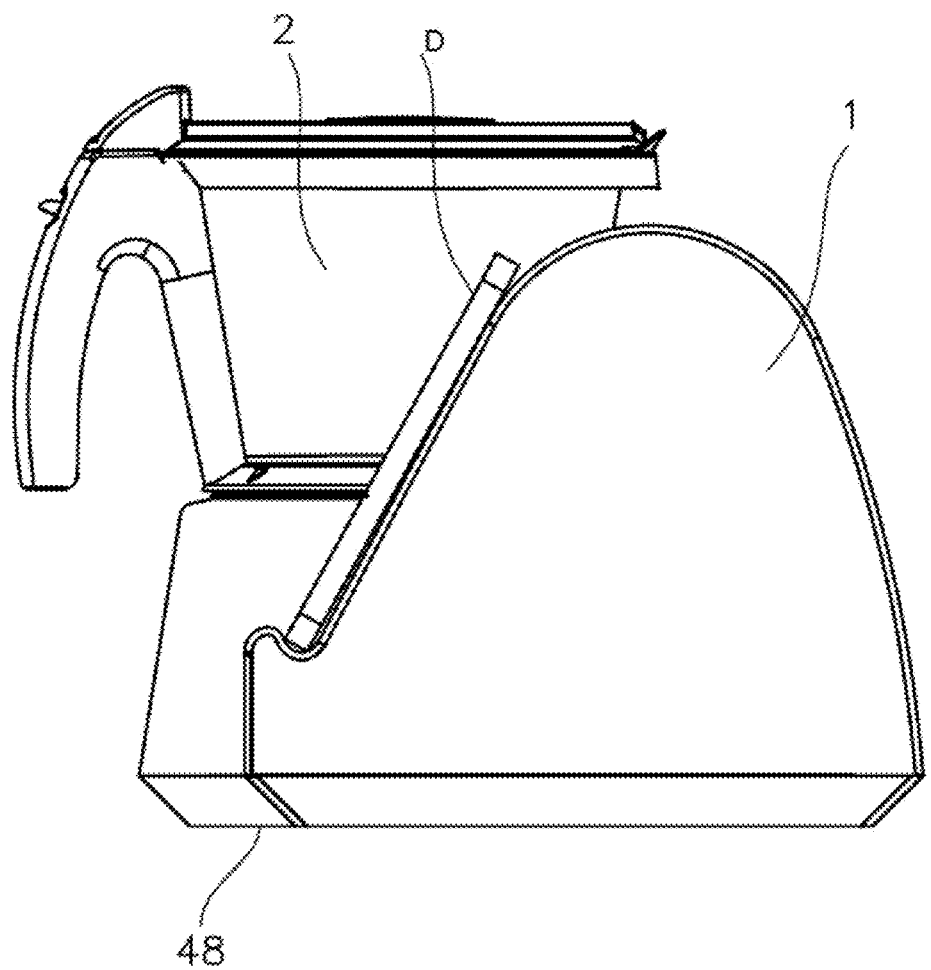
FIG. 1B is an elevational view of the appliance of FIG. 1A, showing a possible arrangement where the user computing device is supported on the casing of the machine.

FIG. 1B shows a possible implementation wherein a seating surface for the user computing device D has been envisaged in the actual casing 1 of the cooking appliance.

Figure 2:
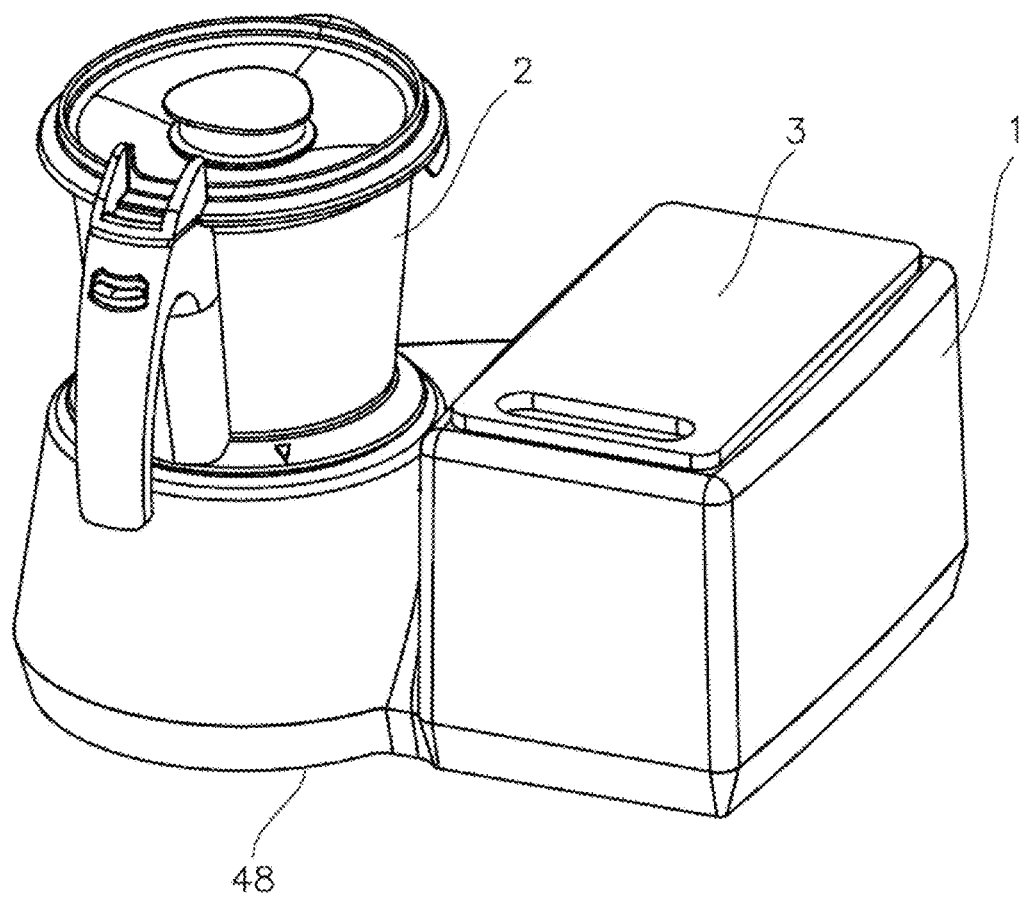
FIG. 2 is an axonometric view of the cooking appliance of the present invention according to another embodiment.
Figure 3:
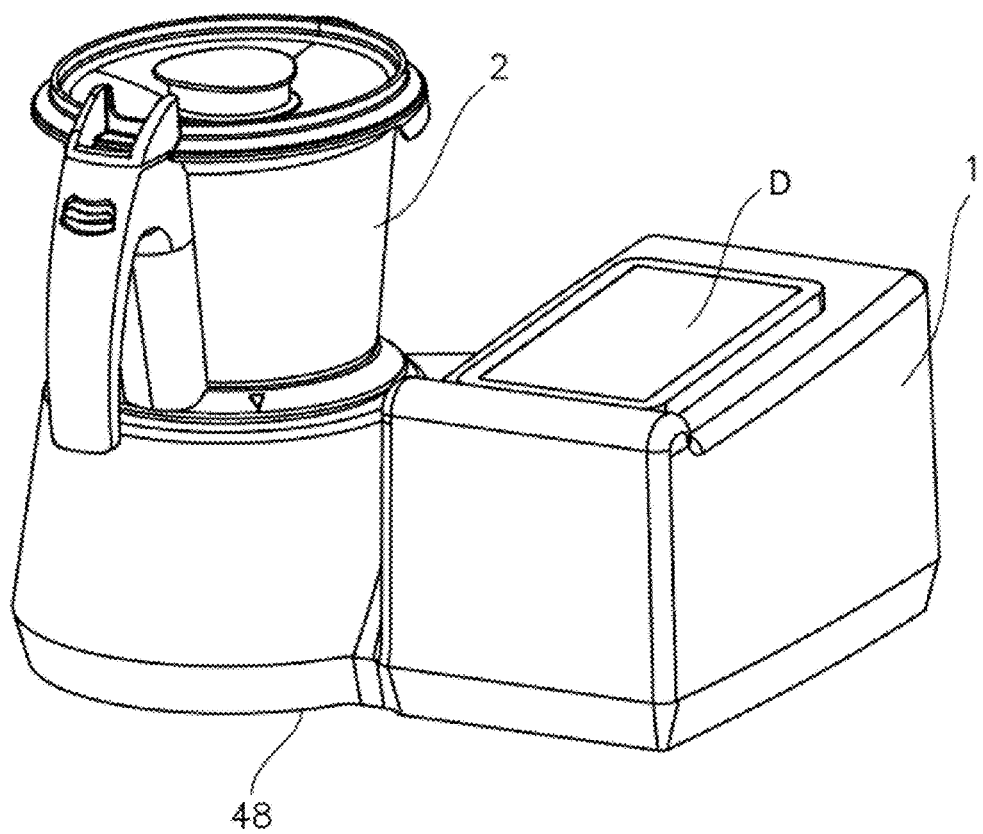
FIG. 3 is an axonometric view of the cooking appliance of the present invention according to another embodiment.

On the other hand and according to other embodiments, the geometry of the casing 1 can be modified (FIGS. 2 and 3) due to the fact that the appliance does not include any user interface integrated therein, and wherein it can include, for example, in an upper region of the mentioned casing 1, a flat surface 3 which is useful for cutting foods, for example, as shown in FIG. 2, or simply a seating surface for the user computing device D itself.

The mentioned user interface is integrated in a user computing device D, for example, a tablet PC or a smartphone, among others, such that all the orders or commands for operating the cooking appliance or the input of cooking programs (for example, a cooking recipe) are performed by means of using the user computing device D generally through a multifunction touch screen and by means of a communication with said appliance microprocessor through a wireless communication interface. The instructions containing cooking parameters in relation to the product to be cooked (e.g. the amount of the foods to be cooked, cooking time, temperature, etc.) can be stored in an internal memory of the user computing device D itself.

The screen of the mentioned user computing device D is also useful for displaying information in the form of videos or a combination of videos with text and message input concerning details relating to the preparation of foods in the cooking appliance.

On the other hand and alternatively, the instructions containing cooking parameters can be stored or are stored in a memory accessible through said communication network, for example, from a cloud type infrastructure.

The operation of the cooking appliance, i.e., the instructions regulating the operation thereof, could also alternatively be stored in the cloud.

Any anomaly detected by said cooking appliance microcontroller due to the unexpected operation of the cooking appliance can also be displayed through the user computing device D.

Figure 4:
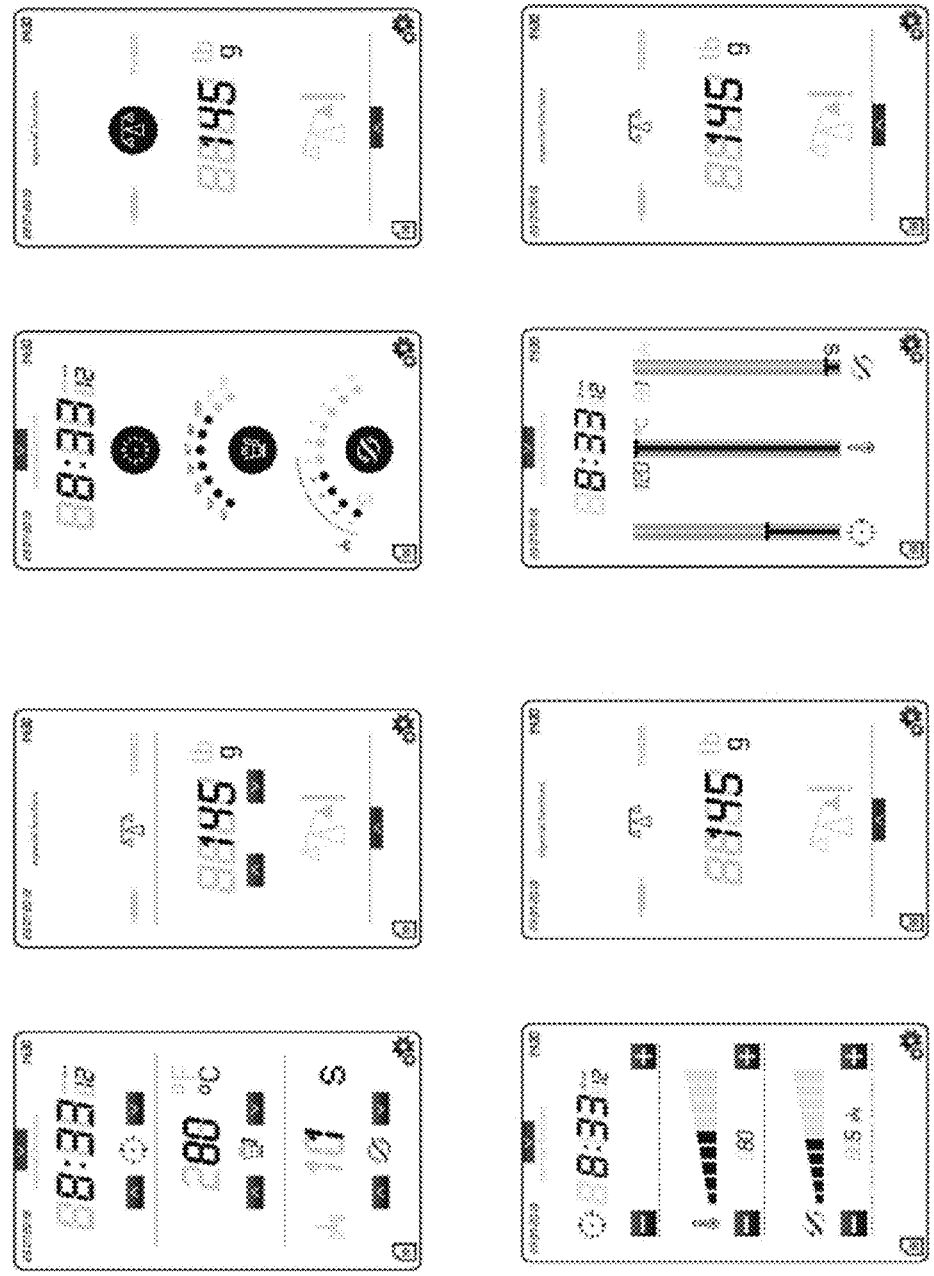
FIG. 4 is a graphical example of the different commands that can be displayed through the user interface of the present invention.
Figure 5:
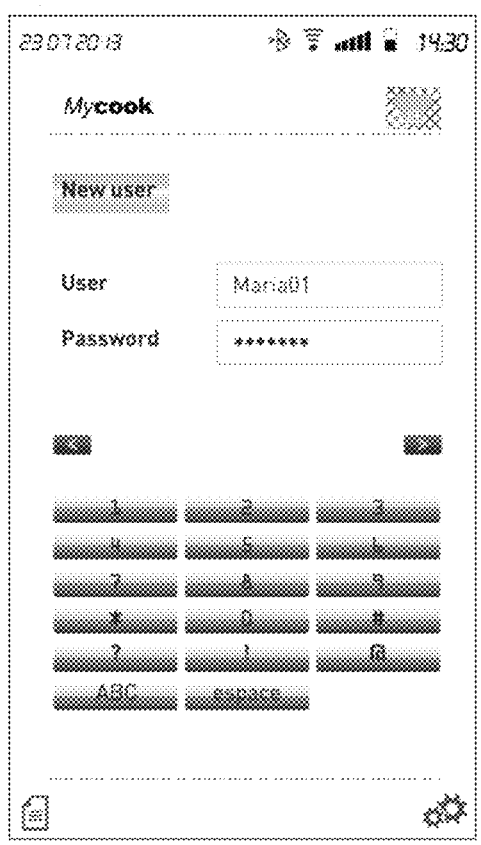
FIG. 5 is a graphical example of how the user interface is accessed by means of an account of said user and/or preferably by means of a password according to one embodiment.

The mentioned user interface can be customized (FIG. 4), i.e., a specific user can choose what type of menus must be viewed or which instructions or how they must also be viewed for interacting with the cooking appliance by means of the appliance microcontroller. The user interface is generally accessed by means of an account of said user and/or preferably by means of a password as can be observed in FIG. 5.

Figure 6:
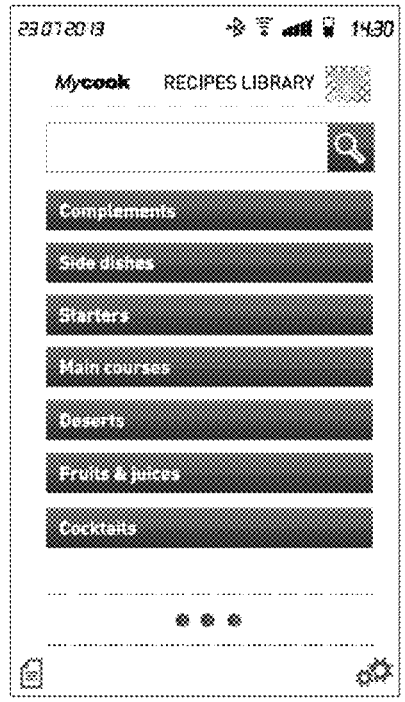
FIG. 6 is a graphical example of how a cooking recipe is edited or how the prepared dishes can be saved and/or displayed or viewed.
Figure 6:
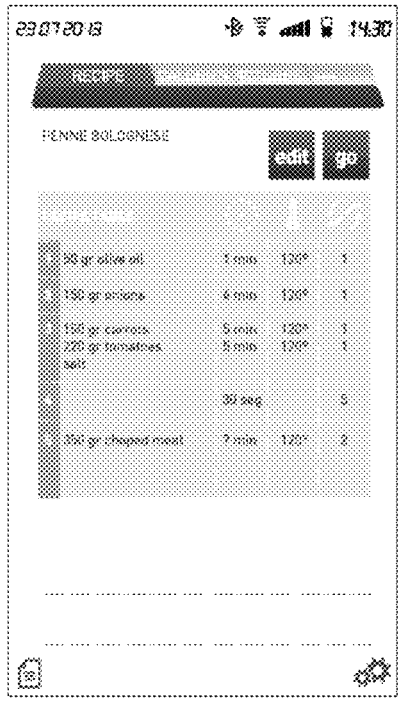
Figure 6:
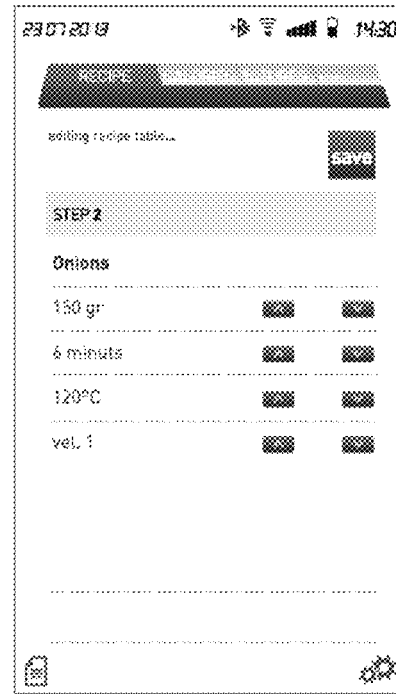
Figure 6:
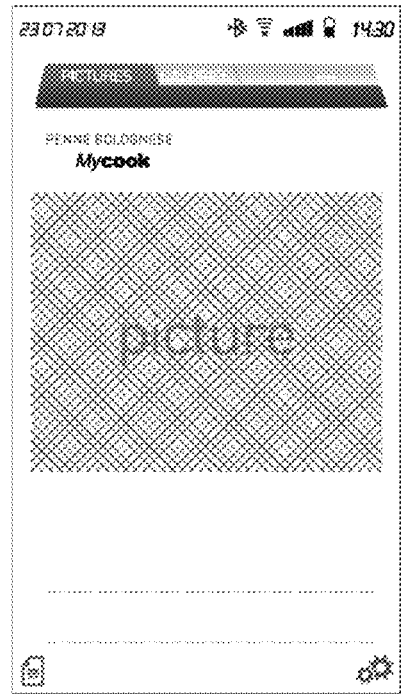

Advantageously and according to an improvement of the present invention, the instructions containing cooking parameters can also be edited by said user (FIG. 6). These instructions can include the different steps of a cooking recipe, being able to create a library comprising the different cooking recipes. These cooking recipes can also be updated and/or shared with other users through different social networks, for example, Facebook® or Twitter®, or through a blog. The images or videos of the final dishes can also be shared with other users.

The user computing device D can include a voice recognition function for inputting operating instructions referring to said cooking appliance.

The integration of the user interface in the user computing device D that is remote and/or separated with respect to the cooking appliance itself allows all the functions to be integrated in a single computing device. The cooking appliance can therefore be manufactured and/or designed with less connection and/or material requirements, more ergonomic including auxiliary parts such as a plate for cutting foods (FIG. 2), etc., which can significantly reduce the production costs and increase the technological value thereof.

The scope of the present invention is defined in the attached claims.

What is claimed is:

1. A cooking appliance for processing and preparing foods with an external user interface comprising:
    a base structure (48) on which a support suitable for holding, a container (2) containing foods to be processed by cooking is assembled;
    a motorized driver suitable for rotating a detachable blade inside said container (2);
    a heater suitable for heating said foods to be processed within the container (2);
    an electronic circuit for powering and controlling said motorized driver and heater which is controlled by an appliance microprocessor depending on instructions containing cooking parameters, and
    a user interface for inputting operating instructions of the appliance and for inputting said cooking parameters, wherein:
    the cooking appliance further comprises a casing (1) having a completely smooth surface free of command and control elements;
    said user interface is integrated in an independent user computing device (D) that is separate with respect to the cooking appliance; and
    said independent user computing device (D) is communicated with said appliance microprocessor through a wireless communication interface
    whereby the cooking appliance being devoid of any user interface containing controls, knobs or push buttons or a display, being the user interface of the independent computing device (D) the only user interface usable for inputting operating instructions or cooking parameters to the cooking appliance.

2. The cooking appliance according to claim 1, wherein said user computing device (D) includes a multifunction touch screen for inputting said operating instructions of the cooking appliance.

3. The cooking appliance according to claim 2, wherein said user computing device (D) is selected from a tablet PC, a smartphone, a PDA, a portable computer or a PC with telecommunication means.

4. The cooking appliance according to claim 1, wherein said instructions containing cooking parameters are stored in said user computing device (D) in a memory thereof.

5. The cooking appliance according to claim 4, wherein said user computing device (D) is selected from a tablet PC, a smartphone, a PDA, a portable computer or a PC with telecommunication means.

6. The cooking appliance according to claim 4, wherein said user computing device (D) includes means for editing said instructions containing cooking parameters by said user.

7. The cooking appliance according to claim 1, wherein said user computing device (D) is suitable for interacting with a communication network using a technology selected from WiFi, 3G or Bluetooth.

8. The cooking appliance according to claim 7, wherein said instructions containing cooking Parameters are stored in a memory accessible through said communication network from said user computing device (D).

9. The cooking appliance according to claim 8, wherein said user computing device (D) is selected from a tablet PC, a smartphone, a PDA, a portable computer or a PC with telecommunication means.

10. The cooking appliance according to claim 8, wherein said user computing device (D) includes means for editing said instructions containing cooking parameters by said user.

11. The cooking appliance according to claim 1, wherein said user computing device (D) is selected from a tablet PC, a smartphone, a PDA, a portable computer or a PC with telecommunication means.

12. The cooking appliance according to claim 1, wherein said user computing device (D) includes a voice recognition function for inputting operating instructions of the cooking appliance.

13. The cooking appliance according to claim 1, wherein said user interface can be customized and accessible using a user account and/or password.

14. The cooking appliance according to claim 1, wherein said user computing device (D) includes means for editing said instructions containing cooking parameters by said user.

* * * * *